June 26, 1923.
L. W. THOMPSON
1,460,000
PROTECTIVE DEVICE FOR POLYPHASE CIRCUITS
Filed April 7, 1920
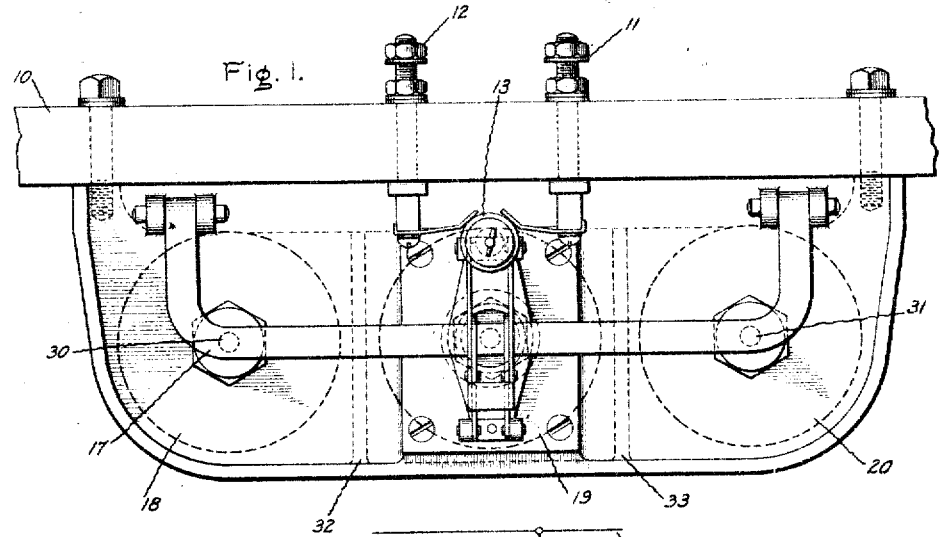
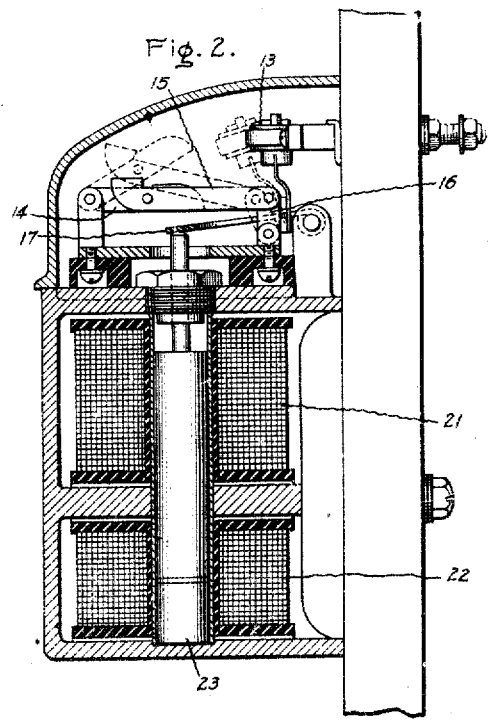
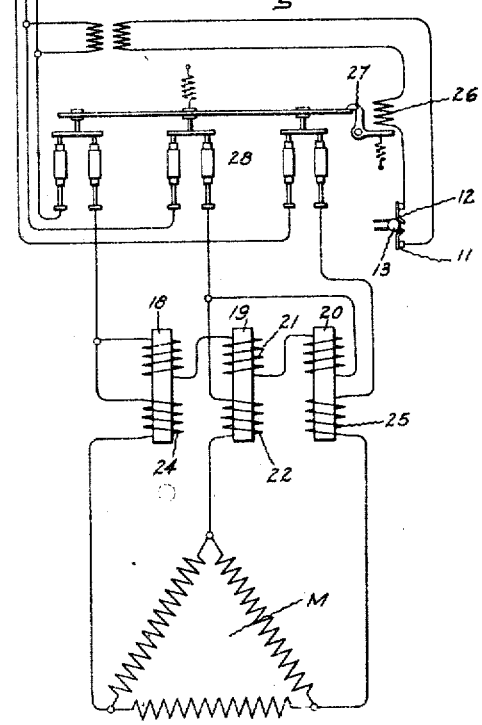
Inventor:
Louis W. Thompson,
by
His Attorney.

Patented June 26, 1923.

1,460,000

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

PROTECTIVE DEVICE FOR POLYPHASE CIRCUITS.

Application filed April 7, 1920. Serial No. 371,798.

*To all whom it may concern:*

Be it known that I, LOUIS W. THOMPSON, a citizen of the United States, residing at Schenectady, in the county of Schenectady, State of New York, have invented certain new and useful Improvements in Protective Devices for Polyphase Circuits, of which the following is a specification.

My invention relates to improvements in protective devices for polyphase circuits and has for its object means which will automatically open the circuit when one of the phases is open.

For an understanding of my invention reference is had to the accompanying drawing, wherein Fig. 1 is a top view of my protective device; Fig. 2 is a part sectional view of Fig. 1; and Fig. 3 is a simplified diagrammatic connection showing an arrangement embodying my invention.

Referring to the drawing, the protective device comprises electromagnetic switch mechanism suitably mounted on a base 10 of insulating material. The switch contacts 11 and 12 are adapted to be bridged by means of the movable contact element 13 which is secured to a part of the toggle mechanism which comprises the pivoted links 14 and 15 hinged to each other. The right-hand end of the link 15 is pivoted to the upper end of a link 16, the lower end of which is pivotally mounted on the top of the electromagnetic structure. The movable contact 13 is secured to the link 16. The toggle mechanism is broken by means of a pivotally mounted actuating member 17 with which the armatures of the electromagnets, with which my protective device is provided, cooperate to operate the tripping mechanism. The electromagnets 18, 19 and 20 are substantially identical and for an understanding of the same reference is had to Fig. 2. The electromagnet shown in Fig. 2 comprises a shunt winding 21 and a series winding 22 which act upon the movable member of the electromagnet, the armature of plunger 23, which in turn acts upon the actuating member 17 to trip the toggle mechanism and move the contact 13 to open the circuit through the contacts 11 and 12. The arrangement is such that when the shunt winding and the series winding of each of the electromagnets is energized, the magnetic attraction of the series coils for the armatures of the electromagnets will oppose the magnetic attraction of the shunt coils for the armatures, and the armatures or plungers are held in their lower positions, that shown in Fig. 2. It will be understood that each of the series coils 22, 24 and 25 are connected in one of the phases of the circuit to be controlled, and that the shunt coils of the electromagnets may be connected in series across one of the phases of the circuit, as shown in Fig. 3 or in any suitable manner. Referring to Fig. 3, the three-phase motor M is protected by means of my protective device, so that, in case any one of the phases of the polyphase circuit should open, the contact 13 will be automatically moved to open the circuit through the contacts 11 and 12 and thereby deenergize the holding electromagnetic 26 so as to release the biased detent 27 and permit the oil switch 28 to automatically open in accordance with its bias. When one of the phases is opened, the opposing effect of the series coil in that phase ceases and the shunt coil of the corresponding electromagnet will attract its armature and move the same upwards so as to move the actuating member 17 to trip the toggle mechanism and thereby move the contact 13 to open the circuit for the retaining magnet 26.

Thus, with the various parts in the positions shown in the drawing, assume that the phase in which the series coil 22 is included is opened either between the oil switch 28 and the controlled motor or between the three-phase supply circuit 29 and the oil switch, the armature or plunger 23 will thereupon be attracted by the shunt coil 21 and the actuating member 17 will be raised so as to break the toggle mechanism and permit the contact 13 and the various parts of the toggle mechanism to assume the various positions shown in dotted lines in Fig. 2. It will be understood that when the toggle is broken, the various parts will automatically move to the dotted line positions in accordance with their bias to that position. That will open the circuit through contacts 11 and 12 and effect the opening of the oil switch 28 in the manner previously described. The same result will be accomplished in the same manner in case the circuit through either one of the series coils 24 or 25 is opened. In case the series coil 24 is deenergized, the armature 30 will be pulled upwardly to break the toggle mechanism, and in case the series coil 25 is deenergized, the armature 31 will be drawn upwardly to effect the opening of the oil switch. It will be observed that my protective device will positively operate in any case, since if the shunt coils do not receive energy from the supply circuit they will be energized from the motor, and the circuit to the motor will thereby be positively opened in response to abnormal circuit conditions. Thus, if a phase is opened between the source of supply and the protective device, the opposing effect of the series coil in that phase is substantially removed and the shunt winding of that phase will cause the interrupter to operate. In order to insure that the operation of each electromagnet is not affected by the magnetism of the other electromagnets, spacers 32 and 33 of magnetic material are provided. These spacers will provide magnetic paths for the fluxes of the magnets so as to avoid magnetic interference between adjacent magnets, that is, there will be substantially no interference of the flux of one electromagnet upon the armature of an adjacent electromagnet since the spacers shunt the flux of one electromagnet from the movable members of the other electromagnets.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a protective device for a polyphase circuit, means for opening the circuit comprising an electromagnet for each phase, the electromagnets having each a shunt coil, a series coil acting in opposition to the shunt coil and a movable member acted upon by the said coils, whereby upon the failure of any phase the opposing effect of the series coil substantially ceases and the shunt coil of the electromagnet in that phase attracts its movable member and effects the opening of the said circuit.

2. In a protective device for a polyphase circuit, means for opening the circuit comprising an electromagnet for each phase, the electromagnets having each a shunt coil, a series coil acting in opposition to the shunt coil and a movable member acted upon by the said coils, whereby upon the failure of any phase the opposing effect of the series coil substantially ceases and the shunt coil of the electromagnet in that phase attracts its movable member and effects the opening of the said circuit, and means for substantially preventing the magnetic interference of one electromagnet upon the movable member of an adjacent electromagnet.

3. In a protective device for a polyphase circuit, a switch tripping mechanism, an electromagnet in each phase, the electromagnets having each a shunt coil, a series coil acting in opposition to the shunt coil, and a movable member acted upon by the shunt and series coils for operating the tripping mechanism, whereby upon the failure of any phase the opposing effect of the series coil substantially ceases and the shunt coil of the electromagnet in that phase attracts its movable member and moves the tripping mechanism to open the said circuit.

4. In a protective device for a polyphase circuit, a switch contact member and a toggle connected thereto for operating the same, a switch tripping mechanism for operating the said toggle, an electromagnet in each phase, each electromagnet having a shunt coil, a series coil, and an armature acted upon by the shunt and series coils for operating the tripping mechanism, the series coil exerting a magnetic attraction on its corresponding armature which opposes the magnetic attraction of the corresponding shunt coil for the armature, whereby upon the failure of any phase the opposing effect of the series coil substantially ceases and the shunt coil of the electromagnet in that phase attracts its armature and moves the tripping mechanism to trip the said toggle and move the said contact member to open the said circuit.

In witness whereof, I have hereunto set my hand this third day of April, 1920.

LOUIS W. THOMPSON.